United States Patent [19]

Fan

[11] Patent Number: 4,629,611

[45] Date of Patent: Dec. 16, 1986

[54] GAS PURIFIER FOR RARE-GAS FLUORIDE LASERS

[75] Inventor: Bunsen Fan, Peekskill, N.Y.

[73] Assignee: International Business Machines Corporation, Armonk, N.Y.

[21] Appl. No.: 728,121

[22] Filed: Apr. 29, 1985

[51] Int. Cl.[4] ............................ C01B 7/00; C01B 9/08
[52] U.S. Cl. .................................... 423/240; 423/489; 423/490
[58] Field of Search ........................ 423/240 S, 240 R; 423/489, 490

[56] References Cited

U.S. PATENT DOCUMENTS 3,879,680  4/1975  Nuismith et al. .................... 423/490
3,997,652  12/1976  Teller ............................... 423/240 S
4,042,667  8/1977  Ishiwata et al. ..................... 423/490

OTHER PUBLICATIONS

P. M. Johnson, et al. "A Closed-Cycle Gas Recirculating System for Rare-Gas Halide Excimer Lasers", Appl. Phys. Lett. 32, pp. 291-292 (1978).
C. P. Christensen, "High-Repetition-Rate XeF Laser with Gas Recycling," Appl. Phys. Lett. 30, p. 483, (1977).
L. Burlamacchi et al., "Long-Life Operation of an XeCl Excimer Laser," Appl. Phys. Lett. 34, App. 33-35, (1979).
A. Mandl et al., "Selective Removal of $F_2$ Impurity from $NF_3$/Xe/Ne, XeF Laser Mixtures," Rev. Sci Instrum. 53, pp. 301-305, (Mar. 1982).
A. J. Kearsley et al., "Cryogenic Gas Purification and Lifetime Extension of ArF, KrF and XeF Laser Gas Mixtures," American Institute of Physics Topical Meeting on Excimer Lasers, Incline Village, Nev., USA (Jan. 1983), pp. 107-111.
M. C. Gower et al., "Gas Composition and Lifetime Studies of Discharge Excited Rare-Gas Halide Lasers," IEEE J. Quantum Electron, QE-16, pp. 231-234, (1980).
R. Tennant, "Control of Contaminants in XeCl Lasers," Laser Focus, pp. 65-68, (Oct. 1981).
K. O. Kutschke et al., "Rare Gas Recovery Systems for Rare Gas Halide Lasers," Rev. Sci. Instrum. 52, pp. 1655-1656, (1981).

*Primary Examiner*—Andrew H. Metz
*Assistant Examiner*—C. Pak
*Attorney, Agent, or Firm*—Ronald L. Drumheller; John J. Goodwin

[57] ABSTRACT

A closed-cycle gas scrubbing or purification system is described for noble gas and fluorine mixtures, such as are typically used in rare-gas fluoride (excimer) lasers. In a first reaction zone, the fluorine in the gas mixture is converted to titanium tetrafluoride vapor by reaction with titanium at a temperature above 150 degrees C., preferably at about 300 degrees C. The $TiF_4$ vapor is then removed without passivating the titanium by condensing the $TiF_4$ vapor in a separate condensation zone held at a temperature below the temperature of the first reaction zone, preferably at about room temperature. After condensing the $TiF_4$ from the gas mixture, any silicon tetrafluoride in the mixture is chemically removed by contacting the gas mixture with an alkaline earth oxide (preferably either CaO or MgO) in a second reaction zone. Residual contaminants (i.e., contaminants other than $SiF_4$) are removed from the gas mixture by contacting the gas mixture with a metal getter (preferably titanium of zirconium) at a temperature above 600 degrees C., preferably about 900 degrees C. or more. The hot metal gettering preferably is done in the second reaction zone by mixing or layering the metal getter with the alkaline earth oxide and heating the second reaction zone to a temperature above 600 degrees C. Fresh halogen gas is added to the purified rare-gas mixture before it goes back to the laser. Since $SiF_4$ is specifically removed, it is acceptable to use industrial grade titanium to remove the fluorine and as a hot metal getter for residual contaminants.

6 Claims, 1 Drawing Figure

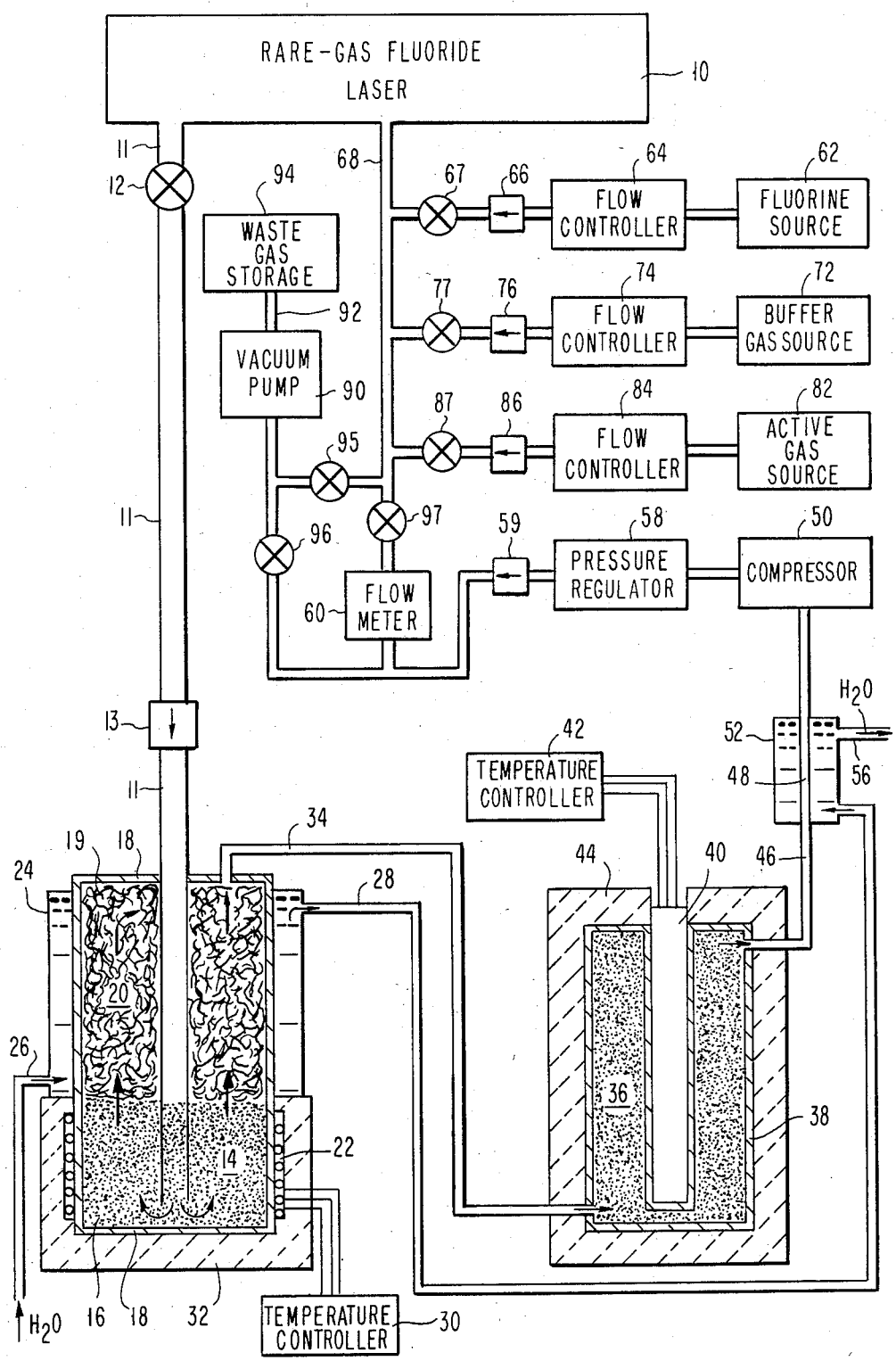

GAS PURIFIER FOR RARE-GAS FLUORIDE LASERS

TECHNICAL FIELD

This invention relates to rare-gas halide (excimer) lasers and more particularly to a recirculating laser gas purification system for closed-cycle operation of rare-gas fluoride lasers.

BACKGROUND OF THE INVENTION

Discharge-excited rare-gas halide (excimer) lasers are efficient sources of high power ultraviolet (UV) light for use in spectroscopic and photochemical applications and are commercially available. A xenon fluoride laser, for example, has received considerable attention for use as a UV source in UV photolithography in the microcircuit fabrication field. However, a major obstacle to operation of rare-gas halide lasers is rapid degradation of the laser gas mixture. In order to operate such laser continuously over a long period of time, it is necessary to periodically or continuously replace the gas mixture in the laser. While it is possible to consider discarding an argon mixture after it has gone through the laser, the high cost of krypton and xenon makes it necessary to reuse these gases.

One method of recovering the noble gases for reuse is to separate the gaseous constituents of the mixture by fractional distillation of the mixture at cryogenic temperatures in a batch process. The disadvantage with cryogenic fractional distillation is that it is expensive, inconvenient and labor intensive. Also, a large volume of rare-gas mixture is required if continuous operation of the laser is desired.

More convenient cold trap batch and continuous processes have also been proposed, which aim to trap the contaminants that condense at or above the cold trap temperature. Some of these cold trap processes pass the halogen, particularly when the halogen is fluorine, thereby in theory removing only the undesirable contaminants. Unfortunately, it seems that there are always some gaseous contaminants which have a condensation temperature below the cold trap temperature and are therefore not removed. These unremoved contaminants tend to build up until a cold trap purified mixture also becomes unusable without other purification. Furthermore, a cold trap purification process generally requires liquid nitrogen for the cooling, which is inconvenient to store and handle.

Another approach has been to purify the rare-gas halogen mixture by removing the contaminants from the mixture through chemical reaction. Unfortunately, the halogens are very reactive, so the halogen must be removed also, either with or preceding the chemical removal of the contaminants. After removal of the halogen and contaminants by chemical reaction, fresh halogen is then added back to the gas mixture before it gets to the laser.

In chemical purification processes of this type, titanium is generally used to remove both the fluorine and the contaminants. In an article by P. M. Johnson et al. entitled "A Closed-cycle Gas Recirculating System for Rare-gas Halide Excimer Lasers," Appl. Phys. Lett. 32, 291 (1978), a two-stage chemical purification process is described where fluorine is removed in a first stage with titanium heated to 300 degrees C. and other impurities are removed in a second stage with titanium heated to 850 degrees C. However, unlimited closed-cycle continuous operation is not possible even with this two-stage purification system because some contaminants are not removed and tend to build up until a rare-gas fluorine mixture purified with this two-stage scrubber is also unusable without other purification.

The following additional articles are representative of the state of the art in this field:
Christensen, "High-Repetition-Rate XeF Laser with Gas Recycling," Appl. Phys. Lett. 30, 483 (1977);
Burlamacchi et al., "Long-Life Operation of an XeCl Excimer Laser," Appl. Phys. Lett. 34, 33 (1979);
Gower et al., "Gas Composition and Lifetime Studies of Discharged Excited Rare-Gas Halide Lasers," IEEE J. Quantum Electron. QE-16, 231 (1980);
Tennant, "Control of Contaminants in XeCl Lasers," Laser Focus (Oct. 1981);
Kutschke et al., "Rare Gas Recovery Systems for Rare Gas Halide Lasers," Rev. Sci. Instrum. 52, 1655 (1981);
Mandl et al., "Selective Removal of $F_2$ Impurity from $NF_3$/Xe/Ne, XeF Laser Mixtures," Rev. Sci. Instrum. 53, 301 (1982);
Kearsley et al., "Cryogenic Gas Purification and Lifetime Extension of ArF, KrF and XeF Laser Gas Mixtures," American Institute of Physics Topical Meeting on Excimer Lasers, Incline Village, Nev., USA (January 1983).

SUMMARY OF THE INVENTION

It is an object of this invention to provide an improved recirculating laser gas purification system for closed-cycle operation of rare-gas fluoride lasers, especially xenon fluoride and krypton fluoride lasers.

Another object is to provide an improved chemical purification system for continuous purification of noble gas and fluorine mixtures.

It is also an object of this invention in a closed-cycle chemical purification system for a rare-gas fluoride mixture to remove the fluorine using inexpensive industrial grade titanium rather than expensive high grade titanium without thereby introducing an undesirable contamination which will build up.

Still another object is to continuously remove silicon tetrafluoride from rare-gas fluoride laser gas mixtures, especially from mixtures of xenon or krypton, neon or helium, and fluorine.

These and further objects are achieved by the disclosed closed-cycle purification system for gas mixtures used in rare-gas fluoride lasers. In a first reaction zone, the fluorine in the gas mixture is converted to titanium tetrafluoride vapor by reacting the fluorine with titanium at a temperature above 150 degrees C., preferably about 300 degrees C. The titanium tetrafluoride vapor is then removed from the gas mixture without passivating the titanium by condensing the titanium tetrafluoride vapor in a separate condensation zone, preferably held at about room temperature. After condensing the titanium tetrafluoride from the gas mixture, one of the contaminants typically found in a rare-gas fluoride laser system, silicon tetrafluoride, is specifically removed from the gas mixture. In a second reaction zone, the gas mixture is contacted with an alkaline earth oxide, preferably either calcium oxide or magnesium oxide, to chemically convert any $SiF_4$ to non-volatile compounds, namely an alkaline earth difluoride and silicon dioxide. Residual contaminants (contaminants other than $SiF_4$ are removed from the gas mixture by contacting the gas mixture with a metal getter at a temperature above 600 degrees C., preferably about 900 degrees C. or more. The metal getter is preferably chosen from Group IVB of the Periodic Table of the Elements with titanium being the most preferred. The hot metal gettering preferably is done in the second reaction zone by mixing or layering the metal getter with the alkaline earth oxide and heating the second reaction zone to a temperature above 600 degrees C. Fresh halogen gas is added to the purified rare-gas mixture before it goes back to the laser.

Hot metal getters such as hot titanium or hot zirconium do not remove silicon tetrafluoride vapor, which is formed in most rare-gas fluoride laser systems by the reaction of fluorine with silicon containing materials found either in the laser itself or in the gas purification or handling system or both. The disclosed closed-cycle rare-gas purification system specifically removes silicon tetrafluoride from the gas mixture by reaction with an alkaline earth oxide, so that this contaminant cannot build up to intolerable levels. Since silicon tetrafluoride is specifically removed, it is acceptable to use industrial grade titanium to remove the fluorine and as a hot metal getter for residual contaminants.

Industrial grade titanium includes a significant amount of impurities. In the first reaction zone, most of these impurities are converted into fluorides which have insignificant vapor pressures at room temperature and therefore do not get beyond the condensation zone (most don't even leave the first reaction zone). The most significant exception is the silicon impurity, which gets converted to silicon tetrafluoride vapor. Silicon tetrafluoride is not removed in the condensation zone because its remains a vapor until about $-95$ degrees C. The alkaline earth oxide getter is provided specifically for the purpose of reacting with silicon tetrafluoride vapor.

BRIEF DESCRIPTION OF THE DRAWING

The Drawing schematically illustrates a closed-cycle purification system for a rare-gas fluoride laser in accordance with this invention.

DESCRIPTION OF THE PREFERRED EMBODIMENT

Referring now to the Drawing, a closed-cycle rare-gas purification system is shown for a rare-gas fluoride laser 10. The gas mixture in such a laser 10 typically comprises a noble buffer gas (typically neon or helium), a noble active gas (typically argon, krypton or xenon) and fluorine gas. Undesirable gaseous contaminants also frequently found in rare-gas fluoride laser gas mixtures include water vapor, carbon dioxide ($CO_2$), nitrogen dioxide ($NO_2$), and various compounds of fluorine and oxygen, nitrogen, carbon, hydrogen or silicon, such as $F_2CO$, $FNO$, $FNO_2$, $NF_3$, and $SiF_4$.

Although a rare-gas purification system in accordance with this invention may be operated in a batch mode (i.e. the gas mixture is purified only intermittently), the preferred mode of operation is to continuously clean or scrub the gas. Accordingly a continuous mode of operation is shown and will be described. Laser gas from laser 10 is carried via conduit 11 through shut-off valve 12 and check valve 13 to a first reaction zone 14, where the gas is passed through a bed of granular titanium 16. The granular titanium is contained in a lower part of a reaction vessel 18 formed from a suitable material such as stainless steel or nickel. The upper part of reaction vessel 18 is filled with copper wool 19 and forms a condensation zone 20. The lower part of reaction vessel 18 is heated with a heater 22 while the top part of vessel 18 is cooled by a water jacket 24 to a temperature below the temperature of the lower part. Cooling water enters jacket 24 via conduit 26 and leaves via conduit 28. Temperature controller 30 electrically controls heater 22 so as to maintain a desired temperature. Insulation 32 surrounding heater 22 not only makes the heater more efficient but also prevents the heater from inadvertently heating the cooling jacket 24.

Controller 30 maintains the temperature of the titanium granules above 150 degrees C. (the minimum temperature at which appreciable $TiF_4$ will be formed), preferably above 200 degrees C., and most preferably at about 300 degrees C. While a higher temperature obviously could be used (limited only by the melting point of the vessel 18 and the titanium 16), a higher temperature is not needed to efficiently convert the fluorine in the gas mixture to gaseous titanium tetrafluoride. A significantly higher temperature furthermore makes it more difficult to cool the gas in the following condensation zone 20, where the temperature of the gas must be lowered to a temperature below the sublimation point of titanium tetrafluoride (about 283 degrees C.). Cold tap water flowing through jacket 24 produces a sufficiently cool condensation zone in the copper wool to efficiently condense the titanium tetrafluoride. It should be apparent, however, that other ways of forming a condensation zone having a temperature less than 283 degrees C. could be used instead, such as air cooling of the gas with room temperature air.

While other metals and compounds also form fluoride compounds, titanium is chosen because the tetrafluoride of titanium may be efficiently formed and is volatile (i.e. does not passivate the titanium) at a very convenient temperature (i.e. at about 300 degrees C.) and is readily condensable also at a very convenient temperature (i.e. at room temperature). No other metal or compound is known to offer these advantages.

Unfortunately, pure titanium is very expensive and inexpensive industrial grades of titanium (such as vacuum deposition grade titanium) contains a significant amount of impurities, the most important of which is silicon. At room temperature or higher, the silicon impurity in the titanium readily combines with fluorine to produce silicon tetrafluoride, which is a vapor that is not readily condensable (the condensation point of $SiF_4$ is about $-95$ degrees C.). Since the condensation point of xenon ($-107$ degrees C.) is very close to the condensation point of $SiF_4$, it isn't practical to cold trap $SiF_4$ from a xenon mixture. It is a significant aspect of this invention that silicon tetrafluoride is later removed chemically from the gas mixture so that inexpensive commercial grade titanium may be used in reaction zone 14.

The rare-gas mixture with the fluorine now removed is carried by conduit 34 to a second reaction zone 36 where the gaseous contaminants are removed. In the Drawing, reaction zone 36 is defined by a reaction vessel 38 formed of a suitable material such as stainless steel or nickel and is heated by heater 40 to a suitably high temperature, such as about 900 degrees C.

The second reaction zone contains a first getter comprising at least one element from Group IVB of the Periodic Table of Elements. Group IVB consists of titanium, zirconium and hafnium. Industrial grade titanium is preferred as the first getter, but zirconium or a getter alloy or getter mixture containing titanium and/or zirconium can also be used instead. It is expected that hafnium would work equally well but is too expensive and difficult to obtain to be considered seriously.

The second reaction zone also contains a second getter comprising an oxide of an alkaline earth element. The alkaline earth elements are the elements in Group IIA of the Periodic Table of Elements and consist of beryllium, magnesium, calcium, strontium, barium and radium. Calcium oxide is preferred for the Group IIA getter largely because of availability and cost. Magnesium oxide also works well as the Group IIA getter and may be readily substituted for or mixed with calcium oxide. While the other alkaline earth oxides also may be used, use of any of the others probably could not be economically justified.

The first and second getter materials are preferably in the form of granules, so that reaction with a gas mixture may be readily arranged by having the gas mixture flow through a bed of getter materials. The getter materials may be mixed together as illustrated in the drawing or may be arranged in two or more layers of individual getter materials. If the getters are not mixed, either may be placed before or above the other.

It is preferred that the temperature of the second reaction zone be maintained at about 900 degrees C. or more because the Group IVB getter becomes more and more efficient as the temperature gets higher. Satisfactory operation of the Group IVB getter is not possible below 600 degrees C. The highest temperature at which the second reaction zone may be operated will be determined by the vapor pressures of the getter materials and the melting point of the reaction vessel 38. With a nickel vessel 38, the operating temperature of the second reaction zone advantageously may be raised to as high as about 1500 degrees C. Temperature controller 42 electrically connected to heater 40 maintains the temperature of the vessel 38 at the desired temperature. Insulation 44 improves the heating efficiency of heater 40 and the temperature uniformity in vessel 38.

In vessel 38, the contaminants in the rare-gas mixture passing therethrough are removed. The alkaline earth oxide reacts with the silicon tetrafluoride contaminant (generated principally in the first reaction zone where industrial grade titanium is used) to form an alkaline earth difluoride and silicon dioxide. Silicon tetrafluoride reacts with the preferred alkaline earth oxide, calcium oxide, in accordance with the following formula:

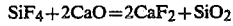

$$SiF_4 + 2CaO = 2CaF_2 + SiO_2$$

A similar formula exists for the other alkaline earth oxides.

The Group IVB element in the second reaction zone acts as a hot metal getter. Other contaminants in the gas mixture (such as $H_2O$, $CO_2$, $NO_2$, $F_2CO$, FNO, $FNO_2$, $NF_3$, $ClO_2$, residual $F_2$, etc.) are all collected by the Group IVB getter.

Conduit 46 takes the hot purified rare-gas mixture through a cooling zone 48 to a compressor 50. Cooling zone 48 is cooled by a water jacket 52 fed by cooling water taken from the other water jacket 24 via conduit 28 and then discarded via conduit 56. Cooling zone 48 brings the purified rare-gas mixture to a suitably lower temperature compatible with compressor 50, pressure regulator 58, check valve 59 and flow meter 60. Air cooling could be used instead of water cooling. No special cooling at all is needed if the subsequent components along the gas flow path can tolerate the high temperature purified noble gases.

Compressor 50 drives the entire flow process by raising the pressure of the rare-gas mixture to a suitable value to provide the desired flow. The pressure of the rare-gas mixture is controlled by regulator 58 and monitored via flow meter 60. Fresh fluorine is added from a fluorine source 62 via a flow controller 64, a check valve 66 and a cut-off valve 67. The fresh fluorine and the rare-gas mixture are combined in and carried by conduit 68 to the laser 10.

Fresh buffer gas (typically neon or helium) is available from a buffer gas source 72 via a flow controller 74, a check valve 76 and a cut-off valve 77. Fresh active gas (typically xenon, krypton or argon) is available from an active gas source 82 via a flow controller 84, a check valve 86 and a cut-off valve 87. Fresh buffer and active gases are needed originally to charge the whole system and to replace any active and buffer gases deliberately or accidently lost or discarded, for example as a result of cleaning or replacement of the laser itself or cleaning or replacement of components or chemicals in the scrubbing system described. Vacuum pump 90 is used to pump out either the laser or the purification system for maintenance thereof. While the pumped out gas could be reused in theory, it is more practical to use fresh gases to replace any gases pumped out for maintenance. However, since the pumped out gases are noble gases, it might be advantageous to store the waste noble gases for later recovery. Conduit 92 connects the discharge of the vacuum pump to a waste gas storage means 94 for this purpose. Cut-off valves 67, 77, 87, 12, 95, 96, and 97 all assist in maintenance functions. Valves 95 and 96 are normally closed, except when either the laser is being pumped out (valve 95 is then opened) or the purification system is being pumped out (valve 96 is then opened). Valves 12 and 97 are normally open except when the laser is being pumped out and a gas charge is being retained in the purification system. Valve 67 is normally kept open except when the laser is being pumped out or when the fluorine source is being replaced. Valves 77 and 87 are normally kept closed except when buffer gas or active gas respectively is being added to the system. Check valves 13, 59, 66, 76, and 86 all prevent any contaminating or detrimental gas back flows in the system.

What has been described is an improved closed-cycle recirculating gas scrubbing or purification system for mixtures of fluorine and one or more noble gases from Group 0 in the Periodic Table of the Elements. Inexpensive commercial grade titanium is used to remove the fluorine in a first reaction zone while an alkaline earth oxide, preferably calcium oxide, is used to remove the silicon introduced by the commercial grade titanium in a second reaction zone. Other contaminants are removed by gettering with a hot metal, preferably titanium.

It should be apparent to those of skill in this art that certain changes and modifications can be made to the described gas purification system without departing from the spirit and scope of this invention. For example, if the first reaction zone is operated at a sufficiently high temperature that the titanium in the first reaction zone not only converts the fluorine to titanium tetrafluoride, but also acts as a hot metal getter to remove the contaminants otherwise removed later by the hot metal getter in the second reaction zone, the Group IVB getter in the second reaction zone is not needed. In such case, only the alkaline earth oxide getter is required in the second reaction zone to remove the titanium tetrafluoride and the operating temperature of the second reaction zone can be lowered substantially. With a much hotter first reaction zone, however, a much larger or more elaborate cooling system will be required for condensing the TiF$_4$, which should more than offset any apparent advantage.

Having thus described my invention, what I claim as new and desire to secure by Letters Patent is:

1. A closed-cycle gas purification method for rare-gas fluorine mixtures, comprising the steps of:

contacting a gas mixture comprising a rare gas and fluorine with titanium at a temperature above 150 degrees C. to convert fluorine in said gas mixture to titanium tetrafluoride vapor, said titanium possibly also containing silicon impurity which simultaneously becomes converted to silicon tetrafluoride vapor;

removing said titanium tetrafluoride vapor from said gas mixture by condensation;

after removing said tetrafluoride vapor from said gas mixture, removing any silicon tetrafluoride vapor from said gas mixture by contacting said gas mixture with an alkaline earth oxide to convert any silicon tetrafluoride to an alkaline earth difluoride and silicon dioxide; and removing residual contaminants from said gas mixture by contacting said gas mixture with a metal getter at a temperature above 600 degrees C.

2. A closed-cycle gas purification method as defined in claim 1 wherein said residual contaminants are removed from said gas mixture by contacting said gas mixture with said metal getter at a temperature above 800 degrees C.

3. A closed-cycle gas purification method as defined in claim 2 wherein said metal getter comprises a Group IVB metal.

4. A closed-cycle gas purification method as defined in claim 3 wherein said Group IVB metal is titanium.

5. A closed-cycle gas purification method as defined in claim 1 wherein said alkaline earth oxide is calcium oxide or magnesium oxide.

6. A closed-cycle gas purification method as defined in claim 1 wherein said removal of said silicon tetrafluoride vapor from said gas mixture with said alkaline earth oxide is carried out at a temperature above 800° C.

* * * * *